United States Patent [19]
Brandon et al.

[11] Patent Number: 5,590,391
[45] Date of Patent: Dec. 31, 1996

[54] DOWN-BLENDING OF FISSIONABLE MATERIAL

[75] Inventors: Norman E. Brandon, Erwin; David R. Hopson, Jonesborough, both of Tenn.; Ronald J. Green, Hamilton, Ohio; James H. G. Grimaud, III; Timothy J. Heagle, both of Johnson City, Tenn.; Kerry D. Schutt, Gray, Tenn.

[73] Assignee: Nuclear Fuel Services, Inc., Erwin, Tenn.

[21] Appl. No.: 375,631

[22] Filed: Jan. 20, 1995

[51] Int. Cl.⁶ .................................................. C01G 43/00
[52] U.S. Cl. .................................................. 423/253
[58] Field of Search .......................................... 423/253

[56] References Cited

U.S. PATENT DOCUMENTS 5,411,722   5/1995   McLean, II et al. ............... 423/253

OTHER PUBLICATIONS

McLean II et al, A Simple Method for Rapidly processing HEU from Weapons Returns, 1994, 12 p. NTIS Order No. DE94008308/XAD.

*Primary Examiner*—Ngoclan Mai

[57] ABSTRACT

A process for reducing the concentration of fissionable uranium containing components of a feed material to below a target concentration level, the process having the steps of providing the feed material as an aqueous system of high-enriched uranyl nitrate hydrate (HE-UNH) wherein at least about 18% of the uranium therein is the $^{235}$U isotope, providing an aqueous dilution medium containing natural uranyl nitrate hydrate (NUNH) wherein at least about 90% of the uranium therein is the $^{238}$U isotope, forcing a diluent stream of the dilution medium through a jet pump to provide a suction region within the pump coextensive with the diluent stream, providing a feed fluid connection of the HE-UNH within the first vessel means with the suction region to cause a HE-UNH stream to flow into the suction region and intermix therein with the diluent stream to form a product stream of markedly reduced $^{235}$U concentration.

6 Claims, 2 Drawing Sheets

DOWN-BLENDING OF FISSIONABLE MATERIAL

FIELD OF THE INVENTION

This invention concerns a process for the conversion or down-blending of feed material to a blend product which contains fissionable components in such dilute condition that self-sustaining fission reactions (a criticality) thereof cannot occur, regardless of the configuration of the vessel in which the blend product is contained. The invention is particularly applicable to down-blending highly enriched uranium (HEU) salt solutions, i.e., feed material which is capable of undergoing self-sustaining fission reactions under conditions which may be encountered in its handling, such as those resulting from the geometry of containment vessels which might cause focusing of emitted neutrons into a critical mass of the material located in the vessel.

BACKGROUND OF THE INVENTION

Heretofore, the down-blending or dilution of hazardous or potentially hazardous feed materials to an acceptable target concentration has been relatively straight forward, i.e., to add the feed materials slowly and carefully to the dilution medium such as, for example, one might dilute concentrated $H_2SO_4$ by adding it slowly to a relatively large amount of water such that the heat of reaction can be readily dissipated before the water is caused to erupt and splash about, or such as adding sodium metal slowly and carefully to an aqueous dilution system. Many such down-blendings have the potential for creating hazards, as do many chemical reactions carried out daily in industry. The techniques and safety equipment for minimizing such hazards are enormously varied and include safety measures and apparatus of enormous complexity.

The dangers of unforseen criticality events which are ever present with fissionable materials are in a different category from those attendant with conventional gasses, liquids or solids in that the immediate and residual effects of an uncontrolled fission accident can cause catastrophic consequences to the environment, both physical and economic, due to radiation release and can be felt by the surrounding population within a very short time of such incident and over vast areas. This being the case, Federal guidelines and requirements for equipment and procedures for the handling of highly enriched uranium (HEU) and other such material have been promulgated and include requirements for fail-safe equipment and procedures requiring safety levels well above and beyond those afforded by electronically controlled pipeline valving, system flooding, automatic pump shut-down mechanisms and the like.

Objects therefore, of the present invention are: to provide an essentially fail-safe system, both method and apparatus, for the down-blending of feed material such as HEU (high-enriched uranium), plutonium, radium or thorium, or the like whereby the blending can only occur in safe proportions of feed material to dilution medium; whereby the primary safety or fail-safe mechanism is not dependent on the functioning of electronic controls, structural devices or the like; and to provide such system for performing the blending of a high-enriched uranyl nitrate hexahydrate, i.e., $UO_2(NO_3)_2 \cdot 6H_2O$, hereinafter HE-UNH, with a natural, depleted, or slightly enriched uranyl nitrate hydrate (NUNH) solution to produce a low-enriched UNH solution.

SUMMARY OF THE INVENTION

These and other objects hereinafter becoming evident have been attained in accordance with the present invention which, in one preferred embodiment is defined as a process for reducing the concentration of fissionable uranium containing components of a feed material below a potentially dangerous level, comprising providing said feed material in first vessel means as an aqueous system of high-enriched uranyl nitrate hydrate (HE-UNH) wherein at least about 18%, and preferably above about 85% of the uranium therein is the $^{235}U$ isotope, providing in second vessel means an aqueous dilution medium containing natural uranyl nitrate hydrate (NUNH) wherein of at least about 90% of the uranium therein is the $^{235}U$ isotope, forcing a diluent stream of said dilution medium from said second vessel means through jet pump means, e.g., venturi eductor to provide a suction region within said pump means coextensive with said diluent stream, providing a feed fluid connection of said HE-UNH within said first vessel means with said suction region to cause a HE-UNH stream to flow into said suction region and intermix therein with said diluent stream to form a product stream of markedly reduced $^{235}U$ concentration, and providing a product fluid connection of said product stream with product vessel means, said forcing, when carried out in an uninterrupted manner can continually withdraw said HE-UNH from said first vessel means, mix it with NUNH in said pump means, and exit said product stream from said pump means and into said product vessel means.

In certain preferred embodiments:

(a) said mixing device is a venturi eductor and the volume of said system which is sucked through the inlet thereof and into contact with said dilution medium is proportional to the volumetric rate of flow of said dilution medium through the barrel of said venturi;

(b) said second vessel means and said product vessel means are the same vessel means;

(c) the molar concentration of $^{235}U$ in said system is from about 0.5 to about 1.4, and the starting molar concentration of $^{238}U$ in said dilution medium is from about 0.4 to about 1.0;

(d) the contents of said second or product vessel means are recycled to said pump means and thereby provide said diluent stream; and (e) both said vessel means are maintained substantially at atmospheric pressure and said first vessel means is positioned below the plane of the top, and preferably below the plane of the bottom of said second vessel means.

It is noted that the present process is operable for practically any starting molar concentrations of the $^{235}U$ in the HE-UNH stream and $^{238}U$ in the NUNH dilution medium, e.g., from about 0.2 to about 2.0.

A preferred apparatus embodiment of the present invention for carrying out the dilution or down blending of materials which are hazardous in concentrated form, is as follows, using HE-UNH and NUNH as exemplary feed and diluent, the apparatus comprising first vessel means for containing an aqueous system of high-enriched uranyl nitrate hydrate (HE-UNH) wherein at least about 18%, preferably above about 90% of the uranium therein is the $^{235}U$ isotope, second vessel means for containing an aqueous dilution medium containing natural uranyl nitrate hydrate (NUNH) wherein of at least about 90% of the uranium therein is the $^{238}U$ isotope, jet pump means having its pumping fluid inlet in fluid communication with said second vessel means through second conduit means, first conduit means fluid connecting said first vessel means with the suction port of said jet pump means, transfer pump means in said second conduit means for forcing a diluent stream of said dilution medium from said second vessel means through said jet pump means to provide a suction region within said jet pump means coextensive with said diluent stream, said first conduit means allowing, in response to flow of said dilution medium through said jet pump means, a HE-UNH stream to flow into said suction region and intermix therein with said diluent stream to form a product stream of markedly reduced $^{235}U$ concentration, and third conduit means placing said product stream into fluid communication with said second vessel means, whereby said forcing, when carried out in an uninterrupted, recycle manner, can continually withdraw said HE-UNH from said first vessel means, mix it with NUNH in said jet pump means, and exit said product stream from said jet pump means and into said second vessel means.

In a further preferred embodiment of The above apparatus, said first vessel means is positioned below the inlet plane of said second vessel means and both said vessel means are provided with vent means for maintaining the interiors thereof at essentially atmospheric pressure.

BRIEF DESCRIPTION OF THE DRAWINGS

The invention will be further understood from the following drawing of certain preferred embodiments thereof, and the description, wherein.

DETAILED DESCRIPTION OF THE INVENTION

Figure 1:
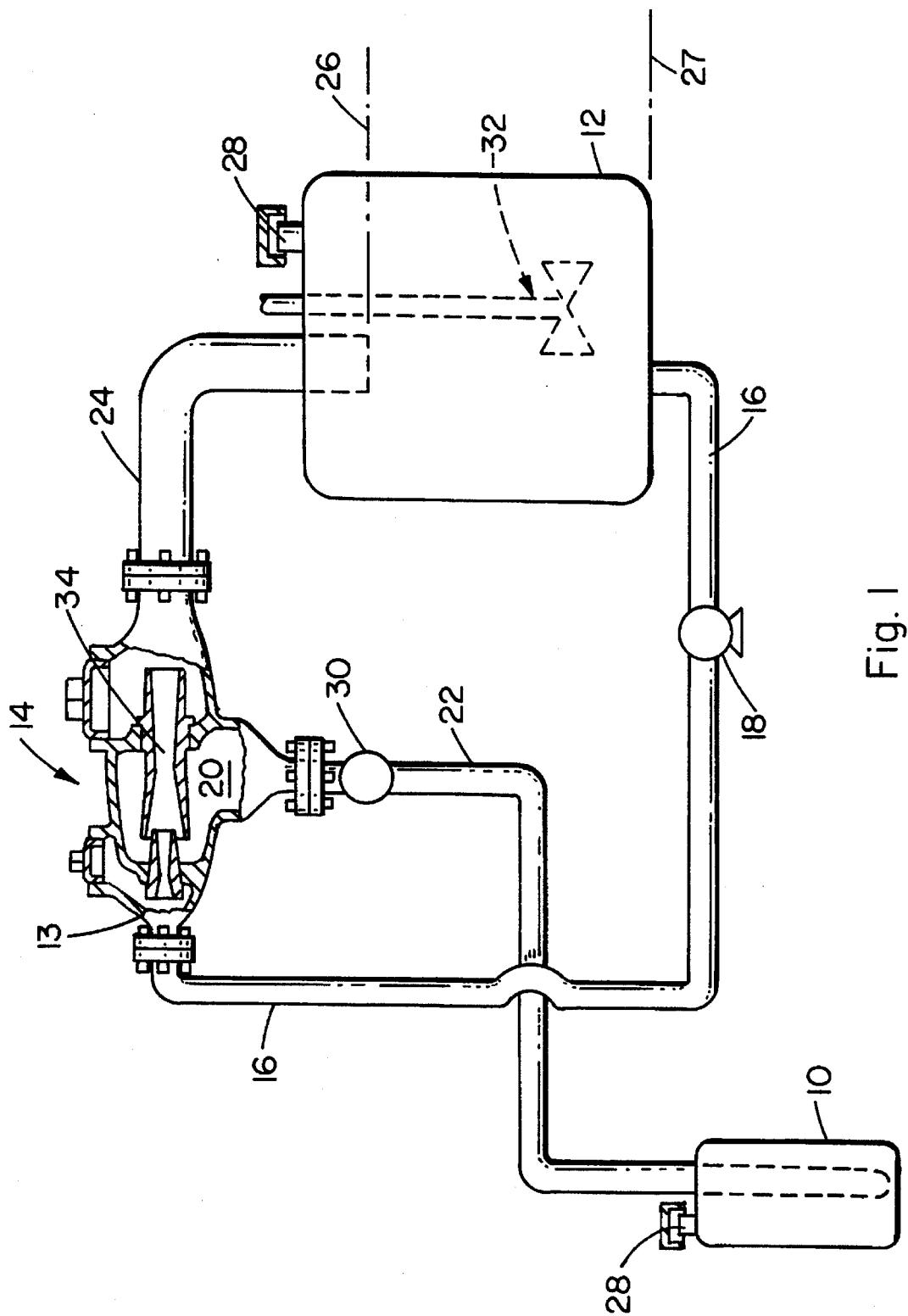
FIG. 1 is a schematic view of a representative embodiment of the apparatus by which the present invention can be carried out, with the jet pump shown in exaggerated dimensions.

Referring to the drawing and with particular reference to claim 7 hereof, the present apparatus comprises first vessel means 10 for containing an aqueous system of high-enriched uranyl nitrate hydrate (HE-UNH) wherein at least about 18%, and preferably above about 90% of the uranium therein is the $^{235}U$ isotope, second vessel means 12 for containing an aqueous dilution medium containing natural uranyl nitrate hydrate (NUNH) wherein at least about 90% of the uranium therein is the $^{238}U$ isotope, jet pump means, e.g., venturi eductor means 14 in fluid communication with said second vessel means through second conduit means 16, transfer pump means 18 in said second conduit means for forcing a diluent stream of said dilution medium from said second vessel means through said jet pump means to provide a suction region 20 within said jet pump mean coextensive with said diluent stream, first conduit means 22 fluid connecting said first vessel means and said suction region to allow, in response to flow of said dilution medium through said jet pump means, a HE-UNH stream to flow into said suction region and intermix therein with said diluent stream to form a dilute product stream of markedly reduced $^{235}U$ concentration, and third conduit means 24 placing said product stream into fluid communication with said second vessel means, whereby said forcing by said transfer pump means, when carried out in an uninterrupted, recycle manner, can continually withdraw said HE-UNH from said first vessel means, mix it with NUNH in said jet pump means, and exit said dilute product stream from said jet pump means and into said second vessel means.

Figure 2:
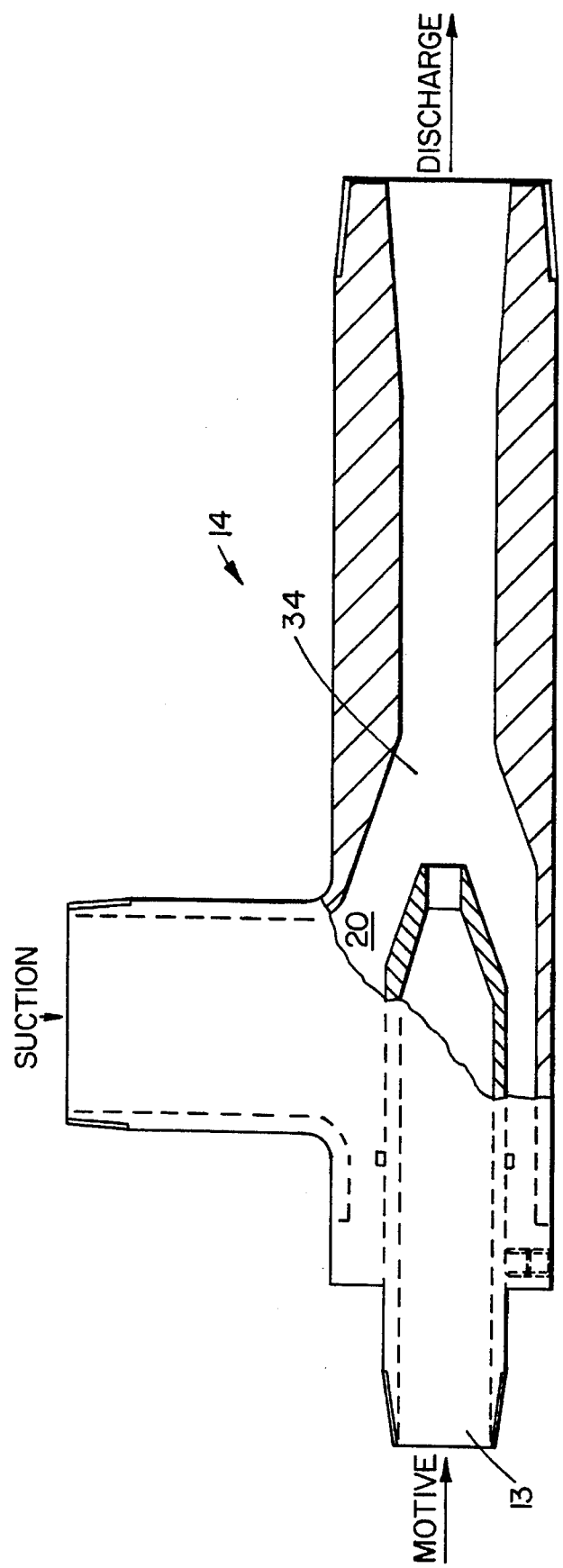
FIG. 2 is a side view, partially in section, of a preferred jet pump or venturi eductor for use in the present invention, wherein equivalent structures to FIG. 1 are numbered the same.

It is preferred that the first vessel means is positioned below the inlet plane 26 of the second vessel means, preferably below the bottom plane 27 thereof, and that both of the vessel means are provided with vent means such as capped but open pipes 28 for maintaining the interiors thereof at essentially atmospheric pressure. The shapes of these vessels can be widely varied, however, their geometries should be selected, preferably, to minimize neutron flux interaction. The jet pump construction, likewise, can be varied and an exemplary one is shown and described in FIG. 6–31 of *Perry's Chemical Engineering Handbook*, 6th Edition, Copyright 1984, McGraw-Hill, New York, and a preferred one is shown in FIG. 2 hereof.

A metering valve such as 30 is preferably provided in first conduit means 22 to adjust the flow of material from said first vessel means to achieve the desired rate of dilution within the jet pump. It is noted that in one preferred embodiment, the metering valve is locked in position, the sucking force of the jet pump is preselected, and the transfer pump output is set, such that only a predetermined flow of material from each vessel is possible, and that a flow of material from first vessel means 10 can only occur when there is a flow through the jet pump.

In carrying out the present process, second vessel means 12, i.e., the enrichment blend tank is initially filled to a specified level with NUNH, which has been sampled and analyzed for gU/liter verification. After the NUNH has been added, the recirculation or transfer pump 18 and a mixer 32 are started. The NUNH is recirculated through the jet pump where it is mixed with a small stream of HE-UNH coming from predetermined volume held in first vessel means 10. The venturi mixer, i.e., jet pump means 14 is utilized so that an HE-UNH addition to an empty enrichment blend tank cannot occur. A reduction orifice provided, e.g., by metering valve 30 ensures that mixing through the venturi results in a safe concentration of NUNH/HE-UNH blend solution entering the enrichment blend tank. This recirculation and venturi blending continues until all the HE-UNH has been added. In the unlikely event that the reduction orifice is ineffective in reducing the high-enriched feed flow to a predetermined rate, flow rate valves and switches may be provided in conduits 22 and/or 24 to stop flow if a uncontrolled flow situation occurs. During the blending operation, blended material may be continually monitored by an in-line $^{235}U$ detector which, e.g., is strategically located between the venturi 34 and the blend tank 12 in order to monitor the blended material as it exits the venturi. If an upset condition occurs such that the blended material $^{235}U$ concentration exceeds the target limit, the in-line detector will initiate closure of the HE-UNH feed valves.

In carrying out the process employing, e.g., a 1000 gal. blending tank 12, the intent would be to have over 3000 liters of solution in the 1000 gal. tank. The HE-UNH solution will initially be staged in safe geometry feed columns having a total capacity of 150 liters. If the source concentrations and flow rates for the two streams mixed are as intended, the product stream from the jet pump and entering the blending tank would have a concentration no higher than about 10 grams of $^{235}U$/Liter. Upon reaching the desired concentration, the blended solution will be transferred on a batch basis from tank 12 to an LEU (low enriched uranium) processing facility.

Typical down blending or dilution parameters are given in the following table wherein HEU=high enriched uranium, and LEU=low enriched uranium.

TABLE I

| Parameter | Min. | Nom. | Max. |
|---|---|---|---|
| HEU % Enrichment | N/A | 90 | 100 |
| Nat. U. % Enrichment | N/A | 0.70 | 0.72 |
| LEU % Enrichment | N/A | 5.0 | 6.0 |
| Liters of HEU | N/A | 125.5 | 150.0 |
| Liters of Nat. U | 3100.0 | 3369.5 | N/A |
| Liters of LEU | N/A | 3495.0 | N/A |
| gU/Liter in HEU | N/A | 271.0 | 275.0 |
| gU/Liter in Nat. U | 180.0 | 200.0 | N/A |
| $g^{235}$U/Liter in LEU = f(Enr.) | | | |
| Enr. = 6% | N/A | 10.1 | 13.8 |
| Enr. = 5% | N/A | 10.1 | 14.3 |
| Enr. = 4% | N/A | 10.1 | 15.2 |
| Enr. = 3% | N/A | 10.1 | 16.8 |

A normal batch of HE-UNH feed solution contains approximately 34 kgs uranium dissolved in approximately 125.5 liters of water. The pH of this solution, as also for the dilution medium is preferably slightly acid and is the consequence of the formation of the intake salt. The actual mass in a batch is a function of the final volume and concentration; however, it should not exceed about 41 kgs uranium. The HE-UNH feed concentration is verified prior to being blended and is normally 271 gU/liter but should not exceed about 275 gU/liter. The NUNH feed concentration is also verified prior to being transferred into the blend tank and is normally about 200 gU/liter but should not be less than about 180 gU/liter. Table I includes the initial nominal and tolerance values for the HEU solution and the diluent solution parameters.

For a 1,000 gal. blend tank, the blend batch should start with at least about 3,100 liters of NUNH at no less that about 180 gU/liter in the blend tank such that the system will be safe when the largest credible volume of the most reactive credible HEU solution is blended with it, i.e., 150 liters of U(100% $^{235}$U)NH, with no excess $HNO_2$, at 275 gU/liter.

The invention has been described in detail with particular reference to preferred embodiments thereof, but it will be understood that variations and modifications will be effected with the spirit and scope of the invention.

I claim:

1. A process for reducing the concentration of fissionable uranium containing components of a feed material to a target concentration level, comprising providing said feed material in first vessel means as an aqueous system of high-enriched uranyl nitrate hydrate (HE-UNH) wherein at least about 18% of the uranium therein is the $^{235}$U isotope, providing in second vessel means an aqueous dilution medium containing natural uranyl nitrate hydrate (NUNH) wherein at least about 90% of the uranium therein is the $^{238}$U isotope, forcing a diluent stream of said dilution medium from said second vessel means through jet pump means to provide a suction region within said jet pump means coextensive with said diluent stream, providing a feed fluid connection of said HE-UNH within said first vessel means with said suction region through first conduit means to cause a HE-UNH stream to flow into said suction region and intermix therein with said diluent stream to form a product stream of markedly reduced $^{235}$U concentration, and providing a product fluid connection of said product stream with said second vessel means, said forcing, when carried out in an uninterrupted, recycle manner, can continually withdraw said HE-UNH from said first vessel means, mix it with NUNH in said pump means, and exit said product stream from said jet pump means and into said second vessel means until all of said HE-UNH has been diluted.

2. The process of claim 1 wherein said pump means comprises a venturi and the volume of said system which is sucked through the inlet thereof and into contact with said dilution medium is proportional to the volumetric rate of flow of said dilution medium through the barrel of said venturi.

3. The process of claim 1 wherein the molar concentration of $^{235}$U in said aqueous system is from about 0.2 to about 2.0, and the starting molar concentration of $^{238}$U in said dilution medium is from about 0.2 to about 2.0.

4. The process of claim 1 wherein the contents of said second vessel means are recycled to said jet pump means through a set orifice and by a set delivery pump means, and wherein the head pressure of said first conduit means is substantially set, whereby predetermined and substantially constant volumetric flow of said HE-UNH stream and said diluent stream is mandated by the equipment.

5. The process of claim 1 wherein said first vessel means is maintained at or below atmospheric pressure.

6. A process for reducing the concentration of the fissionable elements of a feed material to below a desired level, comprising providing said feed material in solution in first vessel means as an aqueous Rads solution, providing in second vessel means an aqueous dilution medium, forcing a diluent stream of said dilution medium through second conduit means from said second vessel means through the pumping fluid inlet of jet pump means to provide a suction region within said jet pump means coextensive with said diluent stream, providing a feed fluid connection of said Rads solution within said first vessel means with said suction region through first conduit means to cause a Rads solution stream to flow into said suction region and intermix therein with said diluent stream to form a product stream of markedly reduced Rads concentration, and providing a fluid connection of said product stream with said second vessel means, said forcing, when carried out in an uninterrupted, recycle manner, can continually withdraw said Rads solution from said first vessel means, mix it with said dilution medium in said pump means, and exit said product stream from said jet pump means and into said second vessel means until all of said Rads solution has been diluted.

* * * * *